United States Patent [19]

German

[11] 4,082,056
[45] Apr. 4, 1978

[54] PRESSURE CHANGE INDICATOR

[75] Inventor: Dale F. German, Roxboro, N.C.

[73] Assignee: Eaton Corporation, Cleveland, Ohio

[21] Appl. No.: 744,677

[22] Filed: Nov. 24, 1976

Related U.S. Application Data

[63] Continuation-in-part of Ser. No. 658,427, Feb. 17, 1976, abandoned.

[51] Int. Cl.² .............................................. B60C 23/04
[52] U.S. Cl. ............................. 116/34 R; 116/114 PV
[58] Field of Search ................ 116/34 R, 114 PV, 70; 251/73; 137/624.27, 557, 227, 228; 73/146.8, 388 R

[56] References Cited

U.S. PATENT DOCUMENTS

| | | | |
|---|---|---|---|
| 1,044,779 | 11/1912 | Hackley | 116/34 R |
| 3,800,736 | 4/1974 | Krohn | 73/388 R |
| 3,910,223 | 10/1975 | Krohn | 251/73 |

Primary Examiner—S. Clement Swisher
Assistant Examiner—Denis E. Corr
Attorney, Agent, or Firm—R. A. Johnston

[57] ABSTRACT

A device for indicating whether the pressure in a pressurized vessel, such as a pneumatic tire, is at or above a desired predetermined level. The device employs pressure-biased indicating means held by releasable means employing a floating latch member in a position indicating vessel pressure at or above the desired level. The indicator means is released by movement of the release means and floating latch member, upon decrease of the pressure in the vessel below the desired level, to move to another position for indicating loss of pressure in the vessel.

5 Claims, 5 Drawing Figures

PRESSURE CHANGE INDICATOR

This application is a continuation In Part of my earlier copending application Ser. No. 658,427 filed Feb. 17, 1976 now abandoned.

BACKGROUND OF THE INVENTION

This invention relates to pressure change indicators and, more particularly, to pressure change indicators of the type suitable for indicating that the pressure in a pneumatic tire has decreased below a predetermined desired level.

In providing a tire pressure level indicator it is known to utilize a pressure-responsive member such as a diaphragm preloaded or biased to move only when the pressure level in the tire drops below the predetermined desired level. Movement of such pressure responsive means has been previously utilized to actuate a pivotal latch for releasing an indicator preloaded for movement and which moves to a position indicating loss of tire pressure below the desired level. One such device is described in U.S. Pat. No. 3,800,736 in which the pressure responsive means is preloaded by the pressure in a reference chamber which is pressurized at a level at or above the predetermined desired tire pressure upon proper inflation of the tire. The aforementioned patented device also utilizes the pressure in the tire to bias the indicator means for movement upon release of same by the latch means.

However, it has been found that the construction of the above-mentioned known tire pressure indicator results in a rather complicated and costly latch arrangement which renders the device difficult to manufacture and maintain in proper working order.

SUMMARY OF THE INVENTION

The present invention is an improvement in the art of providing a means for indicating the pressure in a vessel, such as a pneumatic tire, has dropped below a predetermined desired minimum level. The present invention specifically relates to an improvement in the above-mentioned known releasable latch type pressure indicators.

The present invention provides a tire pressure indicator having a movable indicator means which upon resetting is held in a latched position when the pressure in the tire is at or above the predetermined desired level. The indicator is biased for movement to a new pressure indicating position by the pressure in the tire. A pressure-responsive means is preloaded and biased for movement in a direction opposing the pressure in the tire, and, the pressure-responsive means is in one embodiment preloaded by the pressure in a separate chamber initially charged with the desired pressure in the tire. In another embodiment, the pressure-responsive means is preloaded by a spring. Upon decrease of the pressure in the tire below the desired level, the pressure responsive means moves in reponse to the preload and causes release of the indicator by releasable means for movement to a position indicating desired level of pressure in the tire. The releasable means includes a floating latch member which engages a detent in the indicator means for holding same in the latched position. Movement of the pressure responsive means, upon loss of pressure in the tire, causes the releasable means to permit the floating latch member to disengage the detent in the indicator means permitting the same to move, in response to the bias of the pressure in the tire, to anther position for indicating that the tire pressure has dropped below the desired level.

The present invention also provides an indicator which is resettable by moving the indicator means to a depressed position in which the indicator means in one embodiment permits fluid communication between the tire and the reference chamber for biasing the pressure-responsive means, and thereby permits recharging of the reference chamber upon reinflation of the tire to pressure at or above the desired level. The indicator means is then releasable from the depressed position to the latched position for thereafter monitoring the pressure of the reinflated tire. In another embodiment, the indicator is preloaded by a spring instead of pressure in a reference chamber, thus eliminating the need for depressing the indicator beyond the re-latch position to charge a reference chamber.

DETAILED DESCRIPTION OF THE PREFERRED EMBODIMENTS

Figure 1:
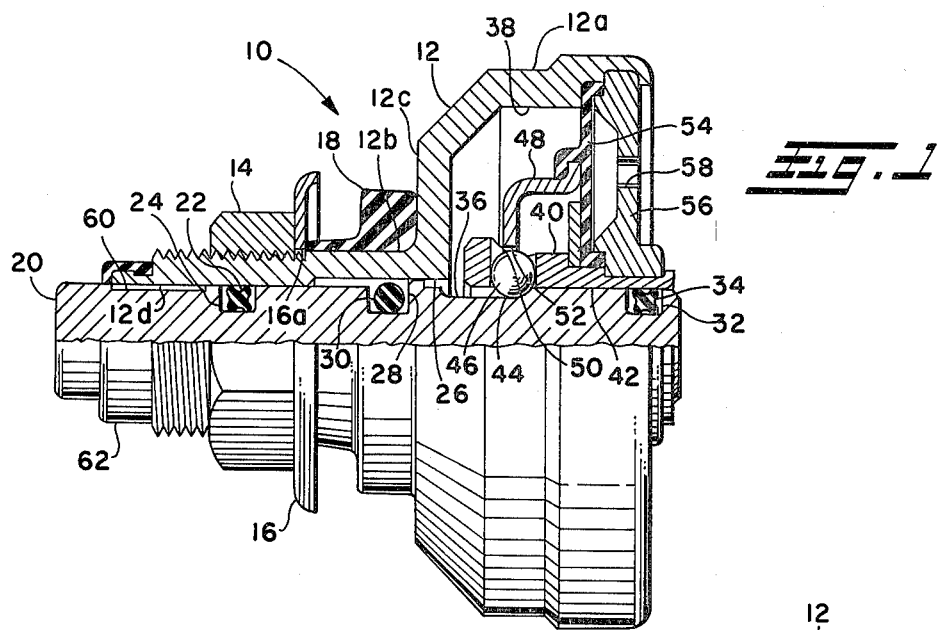
FIG. 1 is an elevation view of the indicator assembly of the present invention with the indicator set in the latched position with portions of the assembly broken away to show the interior components thereof.

Referring now to FIG. 1, in one embodiment the indicator assembly 10 comprises a housing 12 of generally cylindrical configuration having an enlarged diameter portion 12a and a reduced diameter portion 12b adapted for attachment to a pressure vessel as, for example, a tire, by insertion through an aperture formed in the tire rim. In a typical installation shown in FIG. 1, the portion 12b is threaded for engagement with a nut 14 and portion 12b is received through an aperture in 16a formed in a tire rim 16. The housing portion 12b being inserted into the rim from the internal surface of the rim 16 and sealed thereagainst by an annular seal 18. A shoulder portion 12c interconnects the reduced diameter portion 12b and the enlarged diameter portion 12a of the housing 12 and has seal 18 registered thereagainst.

An indicator means 20 is slidably received in a bore 12d provided in the reduced diameter portion 12b of the housing and is sealed thereagainst by a seal ring 22 provided in a groove 24 formed around the circumference of the indicator means 20. The bore 12d has a slightly enlarged diameter portion 26 formed therein and extending to the shoulder region 12c of the housing. A second seal groove 28 is formed in the indicator means axially spaced from the groove 24 and the groove 28 has a second seal ring received therein which seal ring is adapted for sealing only against bore 12d and does not seal against the slightly enlarged bore 26. The indicator means 20 extends axially through the enlarged diameter portion 12a of the housing and has a third seal groove 32 provided around the periphery thereof, spaced closely adjacent the end extending from the housing, and groove 32 has a seal ring 34 received therein. A detent 36 is provided on the indicator means 20, preferably in the form of a peripheral groove disposed axially spaced and intermediate the second and third seal grooves 28 and 32.

The enlarged diameter portion 12a of housing 12 has a hollowed portion 38 formed therein having a diameter substantially larger than the diameter of bore 26 and which diameter extends axially from a position adjacent shoulder 12c to the end of enlarged portion 12a of the housing. A sleeve member 40 is received in the chamber 38 and disposed slidably over the end of the indicator 20, in the region adjacent the third seal ring 34, in closely fitting arrangement such that the seal ring 34 engages the inner periphery 42 of the sleeve in pressure sealing arrangement. The sleeve 40 has at least one, and preferably a plurality of, apertures 44 provided radially through the wall thereof at a common location in peripherally spaced arrangement. Apertures 44 are disposed in the sleeve 40 so as to be axially intermediate seals 30 and 34 in the position shown in FIG. 1, such that the apertures 44 are located over the detent 36 formed on the indicator 20.

A floating latch member 46, preferably of substantially spherical configuration, is received in each of the apertures 44 in closely fitting sliding relationship such that the floating members 46 each register with the end of detent 36 adjacent the third seal groove 32 when the indicator 20 is in the latched position as shown in FIG. 1. Sleeve member 40 is positioned as shown in FIG. 1 with the third seal ring 34 engaging the inner periphery 42 of the sleeve at the end thereof and is retained therein in a manner hereinafter described. The floating latch members 46 are each retained in registration with the detent 36 by releasable means 48 axially movable over the outer periphery of sleeve 40. Sleeve 40 preferably has shoulder 50 provided thereon at an axial station common with the apertures 44, which shoulder 50 provides a registering stop for axial movement of the release means 48 thereby holding the release means at the proper axial station for retaining the floating members 46. The release means 48 is preferably circular and of cupped configuration and has an aperture 52 formed centrally in the closed end thereof for providing the registration surface retaining the floating latch members 46. The outer periphery of the cup 48 is preferably flared radially outwardly for attachment to a pressure responsive means which is preferably in the form of an annular flexible diaphragm 54 having the outer periphery thereof secured in fluid pressure sealing arrangement to the inner periphery of chamber 38 adjacent the axially open end thereof. The inner periphery of the annular diaphragm 54 is secured to the outer periphery of sleeve 40 in a region axially spaced from the apertures 44 and in fluid pressure sealing arrangement. A retaining means 56 formed of rigid material is provided intermediate the periphery of chamber 38 adjacent the axial end thereof and the axial end of sleeve 40 and retains sleeve 40 in fixed relationship within the chamber 38. Retaining means 56 includes fluid port means 58 adapted for providing fluid pressure communication between the axially outer face of diaphragm 54 and the interior of the tire. The annular diaphragm 54 is thus axially secured and sealed at its inner and outer periphery and has the radially intermediate portions thereof axially movable in response to the pressure differential between chamber 38 and the pressure applied through port 58.

Figure 2:
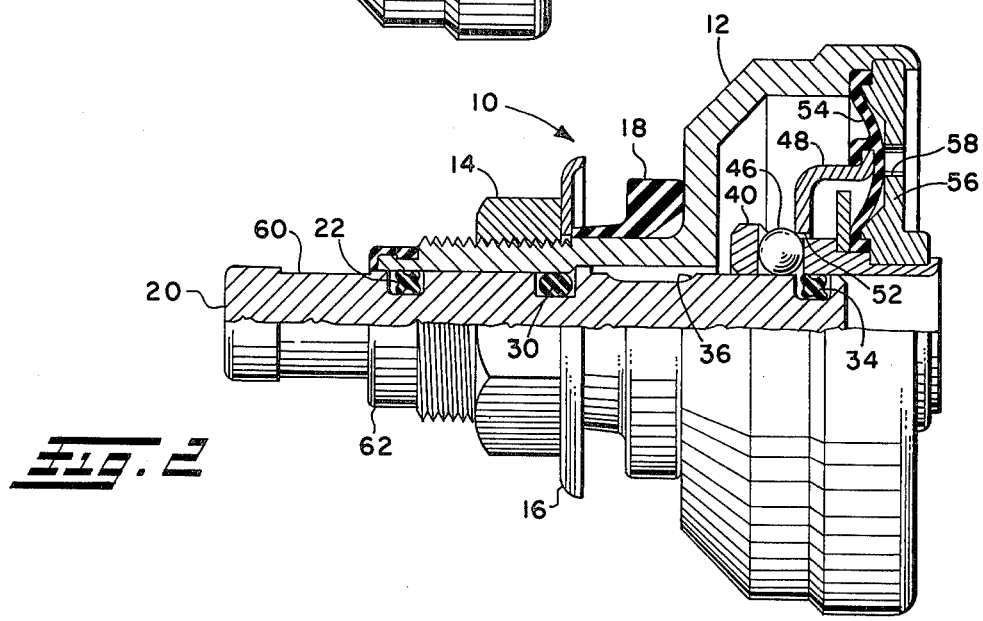
FIG. 2 is a view similar to FIG. 1 and shows the indicator in the unlatched, or released, position.

Upon axial movement of the said radially intermediate portions of the diaphragm 54, release means 48 is caused to move axially along sleeve 40 from a position registering against shoulder 50, and retaining latch member 46 in engagement with detent 36, to a position axially toward the right in FIG. 1 for releasing the floating latch members 46. Referring now to FIG. 2, the diaphragm 54 is shown with the said radially intermediate portions thereof displaced axially to the right and with release means 48 moved therewith to the right to the unlatched position and the floating latch members 46 each moved radially outwardly in aperture 44 such that the latch member 46 no longer engages detent 36 and indicator 20 is thus permitted to move axially and leftwardly in FIG. 2 along bore 12a of reduced portion 12b of housing 12. In the position shown in FIG. 2 indicator 20 has the end thereof extending axially from housing portion 12b for extending and exposing a visual tell-tale 60 provided on the surface thereof. When the indicator means 20 is in the extended condition shown in FIG. 2, the second seal means 30 is engaged with the bore 12d of housing portion 12b in sealing relationship thereby providing a secondary seal to prevent loss of fluid pressure between indicator 20 and the bore 12d of the housing. It will be noted, with reference to FIG. 2, that the third seal ring 34 is maintained in fluid pressure sealing engagement with the sleeve bore 42 when the indicator 20 is in the extreme leftward or extended position shown in FIG. 2. If desired, a wiping seal 62 may be provided over the tell-tale 60 on indicator 20 and secured to the reduced diameter portion 12b of the housing. wiper seal 62 serves to clean the tell-tale 60 upon axial movement of the indicator, thus exposing a clean surface of the visual indicator.

Figure 3:
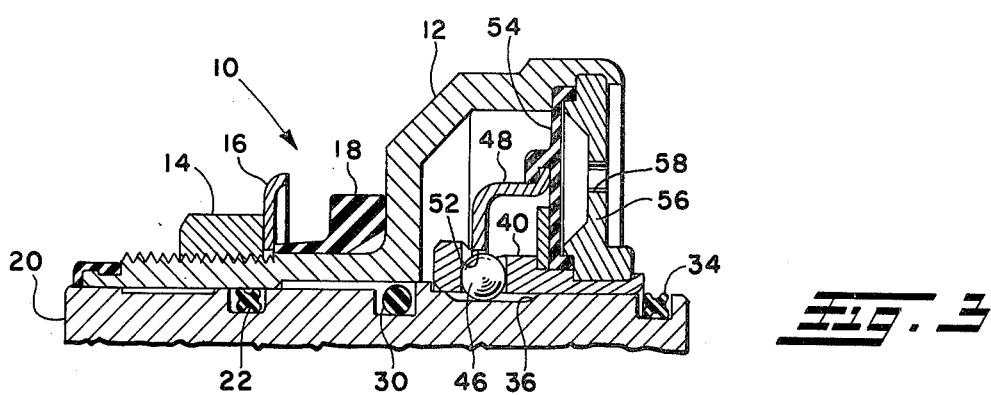
FIG. 3 is a fragmentary cross-section of the indicator assembly of FIG. 1 and shows in solid outline the indicator in the depressed position for recharging the referenced chamber upon inflation of the tire at or above the desired level.

In operation, assuming the indicator 20 has been released to the leftmost position of FIG. 2 by loss of pressure in the tire, the tire would be reinflated to the desired pressure level with the indicator remaining in the position shown in FIG. 2. Upon completion of the reinflation of the tire, the indicator 20 would be depressed to the rightmost position shown in FIG. 3, wherein the third seal ring 34 would extend axially beyond the inner periphery 42 of the sleeve 40 preventing a seal between the indicator 20 and the inner periphery of the sleeve 40. In this rightmost depressed position, pressurized fluid from the tire would be permitted to flow between the indicator 20 and the inner periphery 42 of the sleeve so as to charge the chamber 38 to a common pressure level with the interior of the tire. The pressure within the tire would bias diaphragm 54 leftward such that as the indicator 20 were moved axially rightward so as to pass the detent 36 beneath floating members 46, diaphragm 54 would move axially leftward and cam the floating members 46 into engagement with detent 36 upon the indicator reaching the axial position shown in FIG. 1. Upon continued rightward movement of the indicator toward the position shown in FIG. 3, the floating members 46 each would slide along the detent 36; and, release means 48, retains the floating members 46 against the detent since the reinstated pressure in the tire biases the diaphragm 54 leftward until release means 48 registers against the shoulder 50. Once the release means 20 has been moved to the rightward most position shown in FIG. 3, and the pressurized fluid in the tire permitted to flow into chamber 38 charging same with common pressure with the tire, the pressure is equalized on both sides of diaphragm 54 which remains in a position registering against shoulder 50 on sleeve 40. Thus the floating members 46 are retained in contact with the detent 36. Upon release of the indicator means 20, the pressure in the tire acting over the rightward end of the indicator 20 biases the indicator axially leftward until the end of detent 36 registers against the retained floating latch members 46, thus holding the indicator in the latched or retracted position shown in FIG. 1 for indicating the presence of the desired pressure level in the tire.

Upon decrease of the pressure in the tire below the desired level the retained fluid pressure in chamber 38 biases the diaphragm 54 rightward to the position shown in FIG. 2 thus releasing floating latch members 46 to move radially outwardly under the biasing force of the detent 36 provided the fluid pressure in the tire acting over the rightward end of indicator 20. The indicator 20 is thus released for axial movement to the position shown in FIG. 2 in which position the tell-tale 60 on the end of the indicator is visibly exposed for indicating the pressure in the tire has dropped below the desired level.

Figure 4:
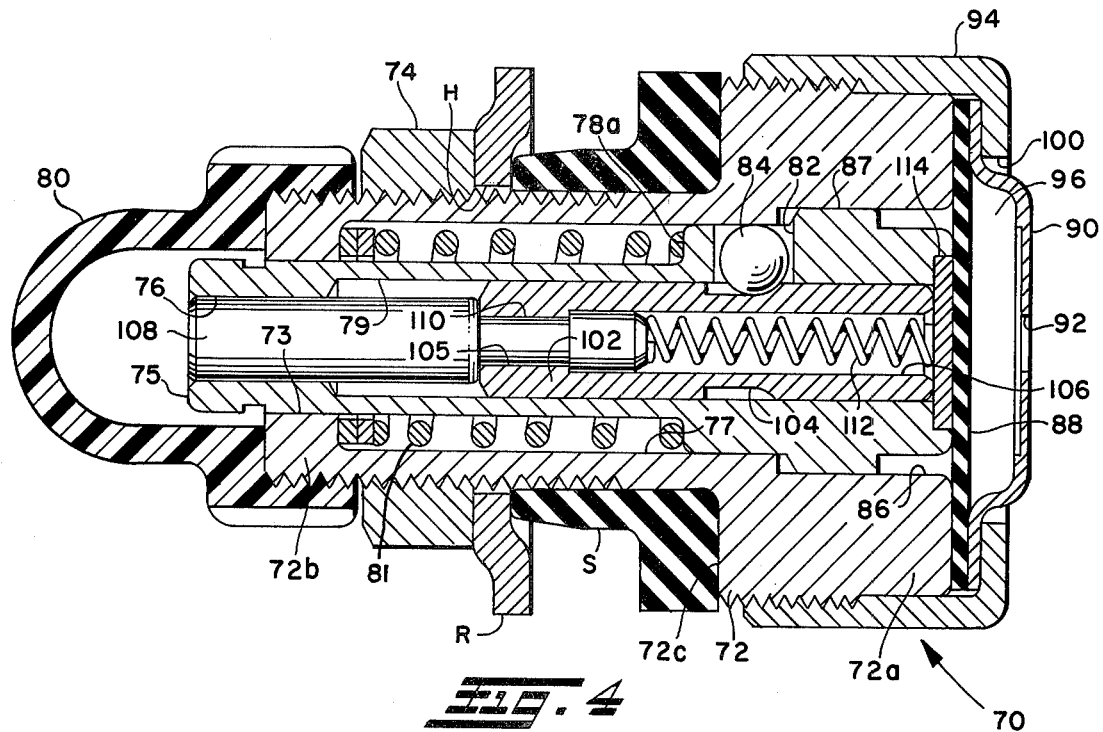
FIG. 4 is a view similar to FIG. 1 of another embodiment of the invention.
Figure 5:
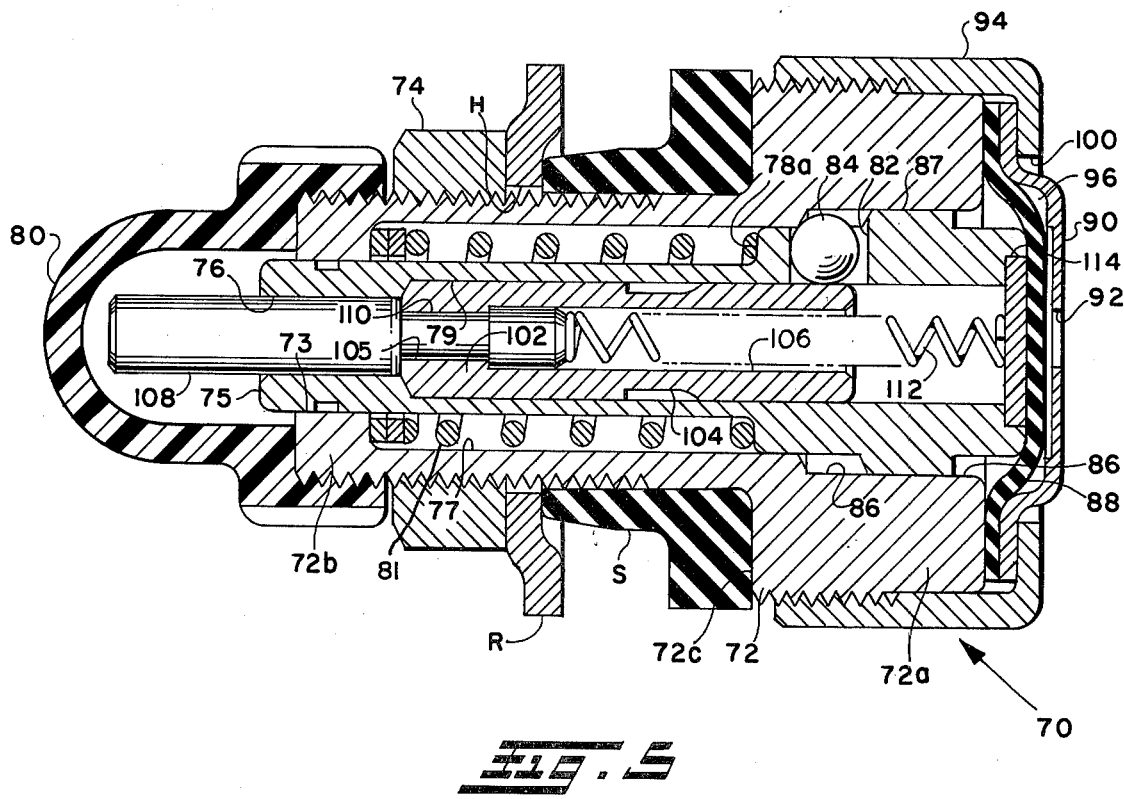
FIG. 5 is a view similar to FIG. 2 of the embodiment of FIG. 4 with the indicator in the released position.

Referring to FIGS. 4 and 5 in another embodiment, the invention is illustrated as an indicator assembly 70 having a housing 72 of generally cylindrical configuration having an enlarged diameter portion 72a and a reduced diameter portion 72b for attachment to a pressure vessel such as a tire by insertion through an aperture formed in the tire rim. In a typical installation as shown in FIG. 4, the smaller diameter portion 72b is received through aperture H formed in tire rim R and is threaded for engagement with a retaining nut 74. A shoulder portion 72c interconnects the reduced diameter portion 72b and enlarged diameter portion 72a of housing 70. An annular seal S is registered against shoulder 72c and intermediate shoulder 72c and the internal surface or right-hand surface of rim R in FIG. 4.

The reduced diameter portion 72b of the housing has a bore 73 provided therein, with a plunger 75 slidably received therein with the left end portion of the plunger extending therefrom. A transparent cap 80 of any suitable material such as plastic is provided to cover the end of the plunger 75 and provide an enclosed space therearound, the cap 80 being removably and preferably threadedly attached over the end of the housing portion 72b. The bore 73 extends through the length of the housing 76 to the larger diameter end 72a and is stepped to larger diameter 77 for the majority of the length of the plunger 75. The plunger 75 is stepped sized so as to interfit in sliding relationship with the stepped bores 73 and 77 of the housing. A spring 81 for providing a preload to urge the plunger in a rightward direction is installed in a compressed state with one end thereof registered on the shoulder between counterbore 77 and bore 76 with the opposite end thereof contacting a shoulder 78a on the plunger between the stepped diameters of the plunger. The plunger 75 has a bore 76 formed axially therethrough and is stepped to a larger bore diameter 79 for the greater portion of the length thereof.

A cross bore 82 is formed through the wall of counterbore 79 and extends to the outer periphery of the diameter of the plunger registering against the inner surface of a bore 86 in the housing of diameter larger than bore 77. A floating latch member 84, preferably in the form of a spherical ball, is received in the cross bore 82. The ball 84 has a diameter thereof greater than the radial length of the cross-bore 82 so as to protrude interiorly of bore 79 when the ball is registered against housing bore 86. Thus bore 86 has registered therein in sliding contact a land 87 formed on the outer periphery of plunger 75 closely adjacent to the right hand end thereof.

A pressure responsive means 88, preferably in the form of a flexible elastomeric diaphragm, extends over the open end of bore 88 and is sealed around the periphery thereof by shield member 90 retained on the housing by threaded cap 94. The shield 90 has the central portion thereof dished in the right-hand direction, with reference to FIG. 4, to provide a chamber 96, for permitting deflection of the diaphragm thereinto during operation of the indicator device 70 and the shield has a central port 92 formed therein for admitting fluid pressure from the tire or other pressurized vessel to diaphragm 88.

The cap 94 has a central aperture 100 formed therein which permits for the dished portion of the shield 90 to extend therethrough such that the cap bears against the periphery of the shield 90 and compresses the outer peripheral portion of the diaphragm against the right-hand end of the housing 72.

The plunger 75 has received in bore 79 in slip-fitting arrangement an indicator member 102, the indicator having a length a predetermined amount less than the length of bore 79 which comprises the length of the permissible movement of the indicator 102 in a leftward direction in bore 79. The indicator 102 has, intermediate its ends, a detent groove 104 formed in the outer periphery thereof for receiving a portion of ball 84 therein in registration against the right-hand side of groove 104. The right-hand edge of groove 104 is inclined toward the axis of the plunger movement in order to provide a cam surface for urging the ball radially outwardly on left-ward movement of the indicator 102 with respect to bore 79 in the plunger.

Indicator 102 has an axial bore 105 provided centrally therethrough, which bore is stepped to a larger diameter 106 opening to the right-hand end of indicator 102, with the diameter 106 extending substantially the length of the indicator. A cylindrical tell-tale 108 is received in plunger bore 76 in slip-fitting arrangement with the right-hand end of a tell-tale 108 having a reduced diameter portion of shank 110 provided thereon which shank is received in plunger bore 104 and extends axially into larger bore of the indicator. The shank 110 is deformed and expanded radially in bore to retain the tell-tale in rigid connection with the indicator 102 for axial movement therewith with respect to the plunger 75. A bias spring 112 is received in bore 106 and is retained therein by retaining plate 114 secured to the right-hand end of plunger 75 in any suitable manner as, for example, staking or crimping. The telltale, if desired, may be made of any suitable plastic material having iridescent, luminescent or hyper reflective properties or may be coated with such a material.

In operation when the pressure vessel as, for example, a tire, is unpressurized or pressurized below the desired pressure, the plunger is biased to the position shown in FIG. 5 in the extreme rightward direction by spring 81 to force diaphragm 88 against the shield 90. As the pressure in the tire is increased, pressure acting on the rightward face of the diaphragm 88 through port 92 tends to urge the plunger 75 in a left-ward direction which is resisted by registration of the ball 84 against the shoulder formed in the housing between counterbore 86 and counterbore 77. In this position the indicator member 102 has the detent groove 104 located axially displaced from the ball 84 such that the outer diameter of the indicator prevents the ball from radially inward movement and thus prevents plunger 75 from axial movement in a leftward direction. When the tire pressure is increased to the desired level, the transparent cap 80 is removed if not already removed from the housing and the tell-tale is manually moved in a rightward direction with respect to plunger 75, until the detent groove 104 is axially positioned beneath the ball 84 such that the ball can move radially inwardly into groove 104. When the ball has dropped into the groove 104 as shown in FIG. 4 and upon release of the manual force from the left end of the tell-tale, the tell-tale moves leftwardly until the cammed edge of groove 104 urges the ball against the leftward edge of cross-bore 82 thus, retaining the indicator and tell-tale in a retracted position such that the tell-tale does not extend beyond the leftward end of plunger 75. Upon release of the manual force from the end of the tell-tale and plunger, the plunger is now free to move leftwardly until the left shoulder of land 87 registers against the shoulder between counterbores 86 and 77, thus retaining the plunger from further leftward movement.

Upon decrease of the pressure in the tire below the desired value, the force acting on the diaphragm 88 is insufficient to overcome the preload of spring 81 and the plunger 75 is moved rightwardly until the diaphragm contacts the shield 90, in which position the ball is cammed radially outwardly by the side of groove 104 against the counterbore 86 as shown in FIG. 5. Spring 112 then moves the indicator and tell-tale leftwardly until the end of the tell-tale extends beyond the left end of the plunger 75 as shown in FIG. 5. Upon reinflation of the tire, the indicator assembly 10 may be reset as described above and the cap 80 replaced.

The present invention thus provides a unique indicator assembly for attachment to the tire wheel rim for which indicates by exposing a visible tell-tale, that the tire pressure has dropped below a desired level. The indicator assembly of the present invention employs floating latch members releasable in response to movement of a pressure responsive means, which floating latch members permits the tell-tale to be extended for visible observation. The floating latch member of the present invention permits the release mechanism to be manufactured in a simple and economic configuration permitting ease of assembly and installation. It will be apparent to those having ordinary skill in the art that the invention as described herein is presented in the preferred form and modifications and variations may be made thereto and the invention is limited only by the scope of the following claims.

What is claimed is:

1. A device for indicating that the pressure in a pressurized container has dropped below a predetermined level, said device comprising:
   (a) means defining a pressure sensing chamber including port means exposing said chamber to the pressure in said container, and sensing means movable in response to change in container pressure;
   (b) indicator means movable with respect to said chamber defining means in response to movement of said sensing means and including engageable detent means;
   (c) means biasing said sensing means in a direction opposing said container pressure such that said sensing means is moved by said bias means when container pressure is less than said predetermined level;
   (d) releasable latch means operable to hold said indicator in a first position indicating pressure in said container of at least the said desired level, said latch means being operative, in response to the pressure in said container falling below said desired level, to release said indicator for movement to a second position indicating that the pressure level is below said predetermined level, said latch means including,
      (i) at least one substantially spherical member adapted to engage said detent means for retaining said indicator means in said first position;
      (ii) retaining means movable in response to movement of said sensing means and operable to retain said substantially spherical member in engagement with said detent means only when said container pressure is of at least said desired level.

2. A device for indicating that the pressure in a pressurized container has dropped below a predetermined level, said device comprising:
   (a) means defining a first pressure sensing chamber including port means exposing said first chamber to the pressure in said container;
   (b) means defining a second reference pressure chamber;
   (c) means operative to initially charge said reference pressure chamber to the level of pressure in said container;
   (d) means responsive to the pressure differential between said first and reference pressure chambers and operative upon sensing a predetermined pressure differential therebetween to move from a first position to a second position;
   (e) indicator means movable in response to the pressure in said container, said indicator means including means defining a latch detent,
   (f) releasable latch means attached to said differential pressure responsive means and movable therewith, said latch means including a substantially spherical member engaging said latch detent when said pressure responsive means and said indicator means are each respectively in said first position, said latch means being operative to maintain said indicator means in a first position when said pressure responsive means is in its said first position for indicating sufficient pressure in said container, and said latch means being operative to release said indicator means for movement to a second position when said differential pressure responsive means is in its said second position, said indicator means thereby indicating insufficient pressure in said container.

3. A device for indicating that the pressure in a pressurized container has dropped below a predetermined level, said device comprising:
   (a) means movable in response to the pressure in said container;
   (b) means biasing said movable means in a direction opposing said container pressure such that said movable means is moved by said bias means when the pressure in said container falls below a predetermined desired level;
   (c) indicator means movable in response to the pressure in said container and including engageable detent means;

(d) releasable latch means operable to hold said indicator in a first position indicating pressure in said container of at least the said desired level, said latch means being operative, in response to the pressure in said container falling below said desired level, to release said indicator for movement to a second position indicating that the pressure level is below said predetermined level, said releasable means including:
  (i) latch means including at least one substantially spherical member adapted to engage said detent means for retaining said indicator means in said first position;
  (ii) retaining means movable with said pressure responsive means and operable to retain said substantially spherical member in said engagement only when said container pressure is of at least said desired level.

4. The device defined in claim 3 wherein said bias means includes means defining a reference pressure chamber charged with the initial pressure in said container and means applying the pressure in said reference chamber to said pressure responsive means.

5. The device defined in claim 4 wherein said indicator means includes means selectively movable to and from a state providing fluid pressure communication between said container and said reference chamber for initially charging same.

* * * * *

UNITED STATES PATENT AND TRADEMARK OFFICE
CERTIFICATE OF CORRECTION

PATENT NO. : 4,082,056
DATED : 4/4/78
INVENTOR(S) : Dale F. German

It is certified that error appears in the above-identified patent and that said Letters Patent are hereby corrected as shown below:

Col. 4, line 34: "wiper" should read---Wiper---.

Col. 6, line 48: After "bore" insert---106---.

line 49: After "bore" insert---106---.

Signed and Sealed this

Twenty-ninth Day of January 1980

[SEAL]

Attest:

SIDNEY A. DIAMOND

Attesting Officer     Commissioner of Patents and Trademarks